(12) United States Patent
Tyger et al.

(10) Patent No.: US 9,375,605 B2
(45) Date of Patent: Jun. 28, 2016

(54) HIGH EFFICIENCY TREADMILL MOTOR CONTROL

(71) Applicant: ICON Health & Fitness, Inc., Logan, UT (US)

(72) Inventors: Michael J. Tyger, Hyrum, UT (US); Derrek Williams, Brigham City, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 0 days.

(21) Appl. No.: 15/013,765

(22) Filed: Feb. 2, 2016

(65) Prior Publication Data

US 2016/0151661 A1 Jun. 2, 2016

Related U.S. Application Data

(63) Continuation of application No. 13/860,255, filed on Apr. 10, 2013, now Pat. No. 9,278,248.

(60) Provisional application No. 61/623,071, filed on Apr. 12, 2012.

(51) Int. Cl.
*A63B 24/00* (2006.01)
*A63B 23/04* (2006.01)

(52) U.S. Cl.
CPC .............. *A63B 22/025* (2015.10); *A63B 23/04* (2013.01); *A63B 24/0087* (2013.01)

(58) Field of Classification Search
CPC .............. A63B 24/00; A63B 24/0062; A63B 24/0087; A63B 22/026; A63B 23/04
See application file for complete search history.

(56) References Cited

U.S. PATENT DOCUMENTS

| 5,545,112 | A | 8/1996 | Densmore et al. |
| 5,586,736 | A | 12/1996 | Mollet |
| 6,443,875 | B1 * | 9/2002 | Golen, Jr. ............... A63B 22/02 482/54 |
| 7,618,346 | B2 * | 11/2009 | Crawford ........... A63B 21/0059 482/51 |
| 7,967,730 | B2 * | 6/2011 | Crawford ........... A63B 21/0059 482/51 |
| 2015/0065301 | A1 | 3/2015 | Oteman |

FOREIGN PATENT DOCUMENTS

CN 1123068 5/1995
(Continued)

OTHER PUBLICATIONS

English translation of Chinese First Office Action and Search Report issued for Chinese Patent Application No. 2013101245764 on Jul. 22, 2015.
Machine English Translation of Abstract of Chinese Patent No. CN201436042U. Apr. 7, 2010.
(Continued)

*Primary Examiner* — Glenn Richman
(74) *Attorney, Agent, or Firm* — Holland & Hart LLP

(57) ABSTRACT

A high voltage direct current signal is obtained from a power supply. The power supply includes power factor correction circuitry. A control command is obtained from an exercise machine. The exercise machine includes a direct current motor. A pulse-width modulation signal is generated from the direct current signal based on the control command. The pulse-width modulation signal is provided to the direct current motor.

20 Claims, 7 Drawing Sheets

(56) References Cited

FOREIGN PATENT DOCUMENTS

| CN | 2330944 Y | 7/1999 |
|---|---|---|
| CN | 1768880 A | 5/2000 |
| CN | 2388632 Y | 7/2000 |
| CN | 101621247 A | 1/2010 |
| CN | 201436042 U | 4/2010 |

OTHER PUBLICATIONS

Machine English Translation of Abstract of Chinese Patent No. CN1768880A. May 10, 2000.
English translation of Chinese Second Office Action and Search Report issued for Chinese Patent Application No. 201310124576.4 on Jan. 25, 2016.

* cited by examiner

HIGH EFFICIENCY TREADMILL MOTOR CONTROL

CROSS-REFERENCE TO RELATED APPLICATIONS

This application is a continuation of U.S. patent application Ser. No. 13/860,255, filed Apr. 10, 2013, which claims priority to U.S. Provisional Patent Application No. 61/623,071 filed Apr. 11, 2012. Each of the aforementioned applications are incorporated herein in its entirety by reference.

BACKGROUND

Exercise machines may use electrical power to operate. For example, a treadmill may use electrical power to operate the treadmill belt that a user walks/runs on. In various situations, the speed that a motor can operate at may be limited by the electrical power that is available. Exercise machines are typically coupled to a mains power supply (through an electrical outlet, for example). Typical commercial wiring provides alternating current (AC) with multiple hot legs and/or higher current circuits. In contrast, typical residential wiring provides AC with a single hot leg (at 120 volts, for example) in a 15 Ampere (amp) maximum circuit. Therefore, a typical residential wiring circuit provides a maximum of 1800 watts.

Some exercise machines may be limited by the 1800 watt limit of the typical residential wiring circuit. For example, the belt speed of known treadmills (e.g., direct current (DC) motor based treadmills) may be limited by the power restrictions of the residential wiring circuit. For instance, the maximum belt speed of known treadmills using residential wiring is 12 miles per hour (mph). In general, known DC motor based treadmills rectify the 120 volt AC power from the residential circuit into DC power that may be supplied to the DC motor. In one example, the DC power may be at 160 volts DC which corresponds to an efficiency of about 65% to 75% and a maximum treadmill belt speed (given the power restrictions of the residential wiring circuit) of about 12 mph. However, in various situations a 12 mph belt speed may be insufficient. For example, a user may desire to run faster than 12 mph.

SUMMARY

In one embodiment, an exercise machine is described. The exercise machine includes a power supply. In some configurations, the power supply may include power factor correction circuitry. The power supply converts an alternating current to a high voltage direct current. The exercise machine additionally includes a direct current motor controller. In some configurations, the direct current motor controller generates a pulse-width modulated direct current signal based on the high voltage direct current. The exercise machine further includes a direct current motor. In some configurations, the pulse-width modulated direct current signal drives the direct current motor.

In one embodiment, the exercise machine may be a treadmill. In some configurations, the power factor correction circuitry includes a boost converter. In one embodiment, the high voltage direct current has a magnitude of at least 180 volts.

In one embodiment, the power supply converts the alternating current to the high voltage direct current with at least 87% efficiency. In some configurations, the pulse-width modulation direct current signal is generated from the alternating current with at least 80% efficiency.

In one embodiment, the exercise machine may additionally include a treadmill belt. In some configurations, the direct current motor drives the treadmill belt. The treadmill belt may travel faster than 13 miles per hour. In one embodiment, the power supply draws less than 1800 watts from a circuit with less than 132 volts alternating current.

In another embodiment, a method to provide high efficiency direct current motor control is described. The method includes obtaining, by a direct current motor controller, a high voltage direct current signal from a power supply. In some configurations, the power supply includes power factor correction circuitry. The method also includes obtaining, by a processor, a control command from an exercise machine. In some configurations, the exercise machine includes a direct current motor. The method additionally includes generating, by the processor, a pulse-width modulation signal from the direct current signal based on the control command. The method further includes providing, by the direct current motor controller, the pulse-width modulation signal to the direct current motor.

In another embodiment, a computer program product for providing high efficiency direct current motor control is described. A high voltage direct current signal is obtained from a power supply. The power supply includes power factor correction circuitry. A control command is obtained from an exercise machine. The exercise machine includes a direct current motor. A pulse-width modulation signal is generated from the direct current signal based on the control command. The pulse-width modulation signal is provided to the direct current motor.

BRIEF DESCRIPTION OF THE DRAWINGS

The accompanying drawings illustrate various embodiments of the present method and system and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

A high efficiency exercise machine is disclosed herein. Specifically, an exercise machine having a high efficiency power system for powering a direct current (DC) motor is disclosed. In some configurations, the high efficiency power system may convert the input AC into high voltage DC with approximately 95% to 97% efficiency. Additionally, the high efficiency power system may convert the input AC into pulse-width modulated DC for the DC motor with approximately more than 90% efficiency.

Figure 1:
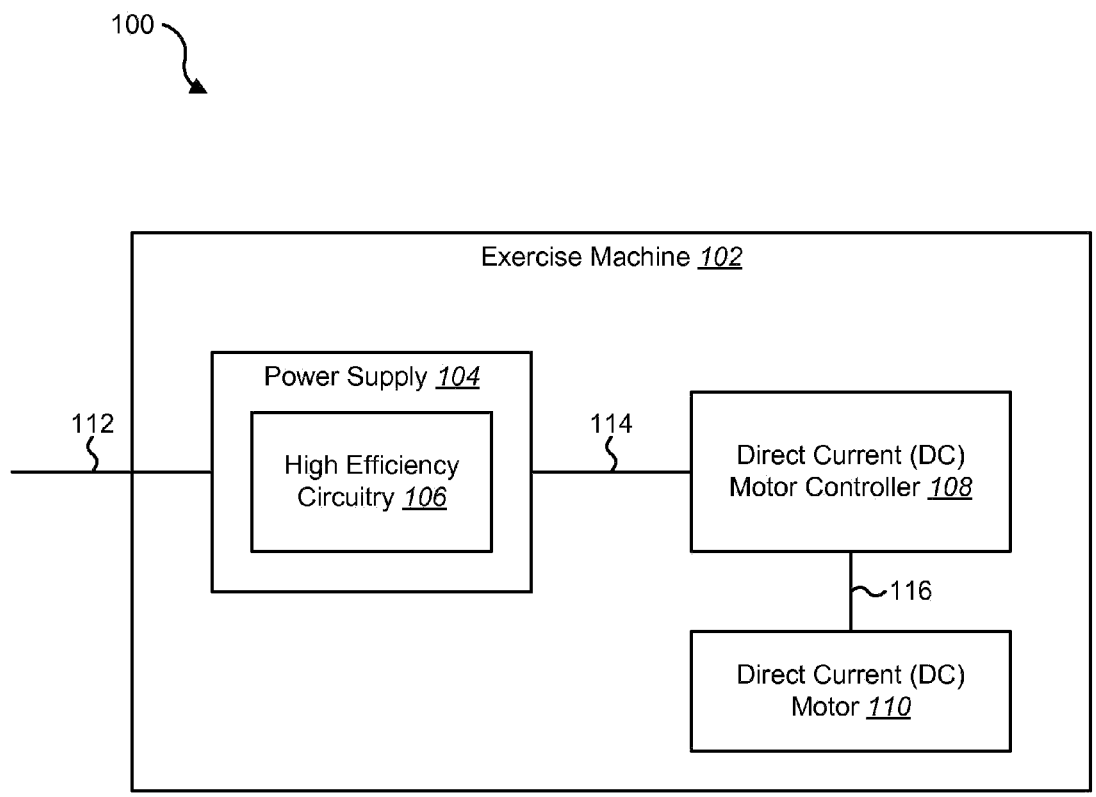
FIG. 1 is a block diagram illustrating one embodiment of an exercise machine that implements the systems and methods described herein.

Referring now to the Figures, FIG. 1 is a block diagram illustrating one embodiment of an exercise machine 102 that implements the systems and methods described herein. In some configurations, the exercise machine 102 may include a power supply 104, a DC motor controller 108, and a DC motor 110.

In some configurations, the power supply 104 may receive power from a mains power supply via connection 112. For example, connection 112 may include a plug that enables the connection 112 to be connected to the mains power supply (through a wall outlet, for example). As used herein, the mains power supply may have the limitations of a typical residential circuit. For example, the mains power supply may provide a single 120 volt leg of AC power with a maximum current of 15 amps. In some configurations, the power supply 104 may be configured to operate within the limitations of the typical residential circuit. It is noted that the parameters of the typical residential circuit may vary with location (the European standard may differ from the North American standard, for example).

In one embodiment, the power supply 104 may receive an input AC via connection 112 and may output a high voltage DC via connection 114. For example, the power supply 104 may receive 120 volts AC and may output 220 volts DC. In some configurations, the power supply 104 may include high efficiency circuitry 106. In some configurations, the high efficiency circuitry may enable the conversion of AC power to DC power with very high efficiency (e.g., 97%).

In one embodiment, the DC motor controller 108 may receive high voltage DC via connection 114 and may output pulse-width modulated DC to the DC motor 110 via connection 116. In some configurations, the DC motor controller 108 may switch the high voltage DC on and off (using MOSFETs, for example) to generate the pulse-width modulated DC signal. For example, the DC motor controller 108 may generate the pulse-width modulated DC signal to cause the DC motor 110 to rotate at a specific speed.

Figure 2:
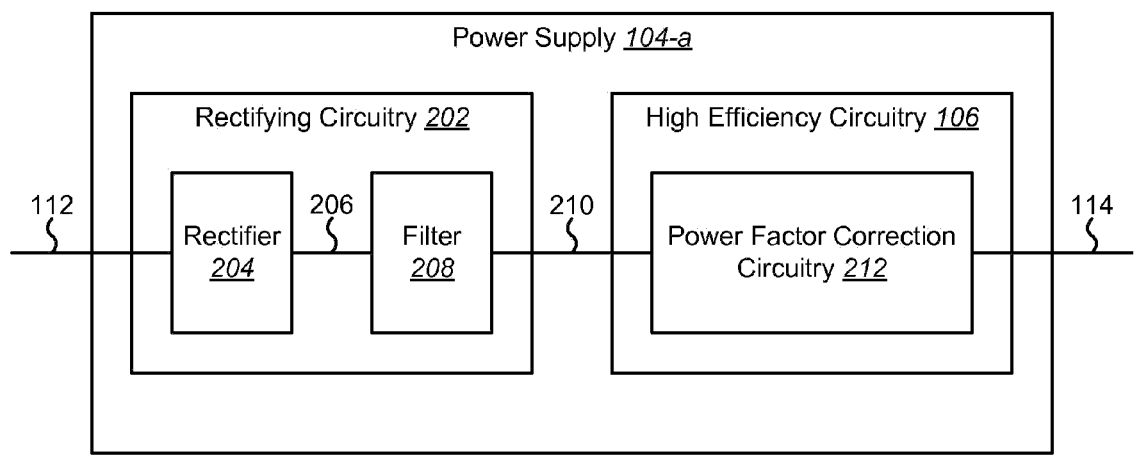
FIG. 2 is a block diagram illustrating one example of a power supply.

FIG. 2 is a block diagram illustrating one example of a power supply 104-a. The power supply 104-a may be one example of the power supply 104 illustrated in FIG. 1. In some configurations, the power supply 104-a may include rectifying circuitry 202 and the high efficiency circuitry 106.

In one embodiment, the rectifying circuitry 202 may include a rectifier 204 and a filter 208. In some configurations, the rectifier 204 may convert AC to DC. For example, rectifier 204 may receive the input AC via connection 112 and may output rectified DC to the filter 208 via connection 206. In some configurations, the rectifier 204 may include a bridge rectifier. In some configurations, the filter 208 may filter the received rectified DC via connection 206 and may output filtered DC via connection 210. For example, the filter 208 may include one or more capacitors for smoothing and filtering out the high frequency components of the rectified DC.

In one embodiment, the high efficiency circuitry 106 may perform DC to DC conversion. For example, the high efficiency circuitry 106 may receive filtered DC via connection 210 and may output high voltage DC via connection 114. In some configurations, the high efficiency circuitry 106 may include power factor correction circuitry 212. In one embodiment, the power factor correction circuitry 212 may correct any phase differences between the voltage waveform and the current waveform of the input AC signal (received via connection 112, for example). In one configuration, the power factor correction circuitry 212 may adjust the current waveform to be in phase with the voltage waveform to obtain a power factor of "1."

Figure 3:
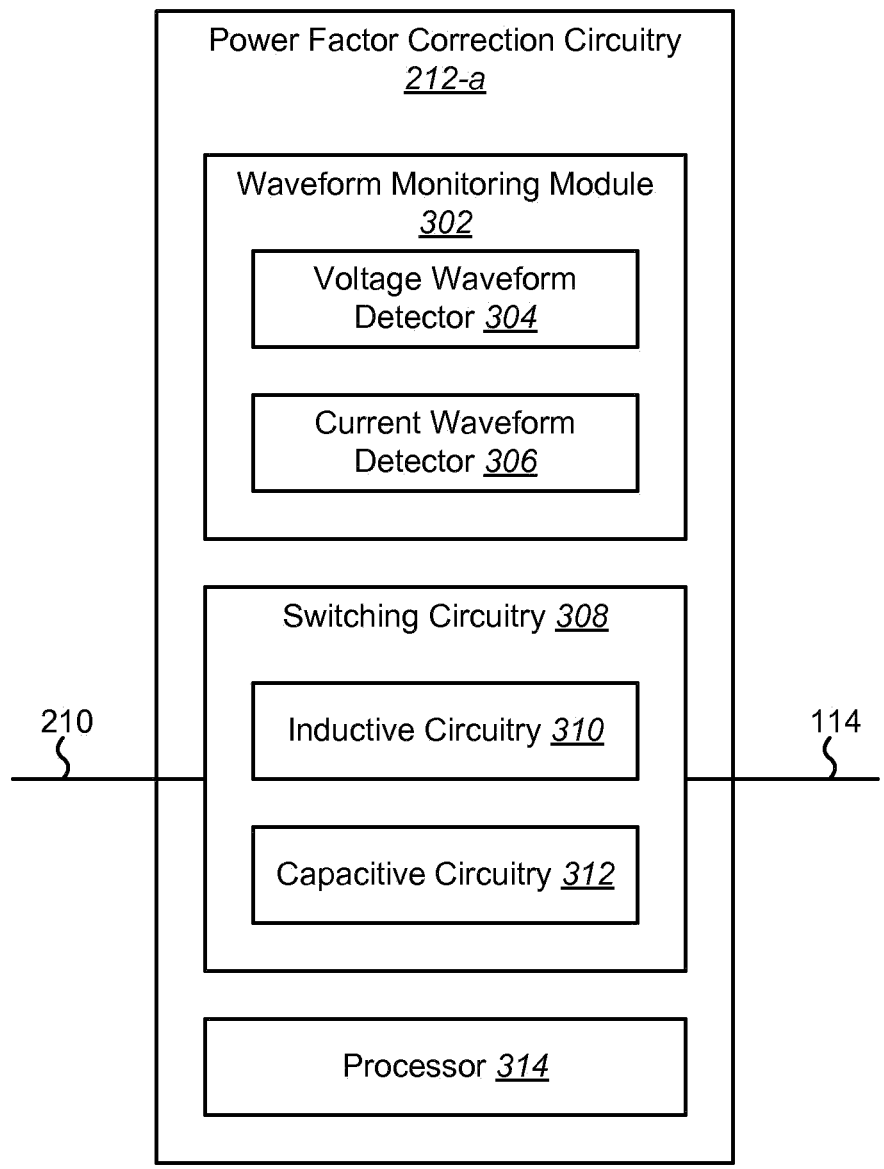
FIG. 3 is a block diagram illustrating one example of power factor correction circuitry.

FIG. 3 is a block diagram illustrating one example of power factor correction circuitry 212-a. Power factor correction circuitry 212-a may be one example of the power factor correction circuitry 212 illustrated in FIG. 2. It may be noted that the power factor may be the ratio of real power flowing to the load over the apparent power in the circuit. The apparent power may be the product of the voltage and the current in the circuit. The real power may equal the apparent power when the voltage waveform is in phase with the current waveform. However, the real power may be less than the apparent power when the current waveform is out of phase with the voltage waveform. For example, real power may be less due to a non-linear load (a capacitive and/or inductive load, for example). A reduction in power factor may directly correspond to a reduction in efficiency. The power factor correction circuitry 212-a may perform power factor correction to enhance the efficiency of the circuit. In some configurations, the power factor correction circuitry 212-a may include a waveform monitoring module 302, a processor 314, and switching circuitry 308.

In one embodiment, the waveform monitoring module 302 may monitor the voltage waveform and the current waveform of the input AC being received via connection 112. In some configurations, the waveform monitoring module 302 may include a voltage waveform detector 304 and a current waveform detector 306. In one embodiment, the voltage waveform detector 304 may detect the voltage waveform of the input AC. For example, the voltage waveform detector 304 may detect the zero crossings of the voltage waveform to determine the phase of the voltage waveform. In one embodiment, the current waveform detector 306 may detect the current waveform of the input AC. For example, the detector 306 may detect the zero crossings of the current waveform to determine the phase of the current waveform. In some configurations, the waveform monitoring module 302 may determine the difference in phase between the current waveform and the voltage waveform.

In one embodiment, the switching circuitry 308 may include inductive circuitry 310 and capacitive circuitry 312. For example, the inductive circuitry 310 may include one or more inductive elements (e.g., inductor, transformer, coil) and the capacitive circuitry 312 may include one or more capacitive elements (e.g., capacitor). In some configurations, the switching circuitry 308 may include one or more switches (e.g., MOSFETs) for switching between the inductive circuitry 310 and the capacitive circuitry 312.

In one embodiment, the processor 314 may manage the power factor correction circuitry 212-a. For example, the processor 314 may control the switching circuitry 310 based on the waveform monitoring module 302. For example, if the current waveform leads the voltage waveform, then the processor 314 may switch the switching circuitry 308 to include the inductive circuitry 310. In this example, the inductive circuitry 310 may counteract capacitance occurring in other parts of the circuit which corrects the phase difference between the current waveform and the voltage waveform (thus providing power factor correction). In another example, if the voltage waveform leads the current waveform, then the processor 314 may switch the switching circuitry 308 to include the capacitive circuitry 312. In this example, the addition of the capacitive circuitry 312 may counteract the inductance occurring in other parts of the circuitry which corrects the phase difference between the current waveform and the voltage waveform (thus providing power factor correction).

In one embodiment, the switching circuitry 308 may be a boost converter, a buck converter, or a buck-boost converter. For example, the switching circuitry 308 may boost the filtered DC that is received via connection 210 from a first DC voltage to a second DC voltage that is output via connection 114. For instance, the switching circuitry 308 (when configured as a boost converter, for example) may output 220 volts DC via connection 114.

Figure 4:
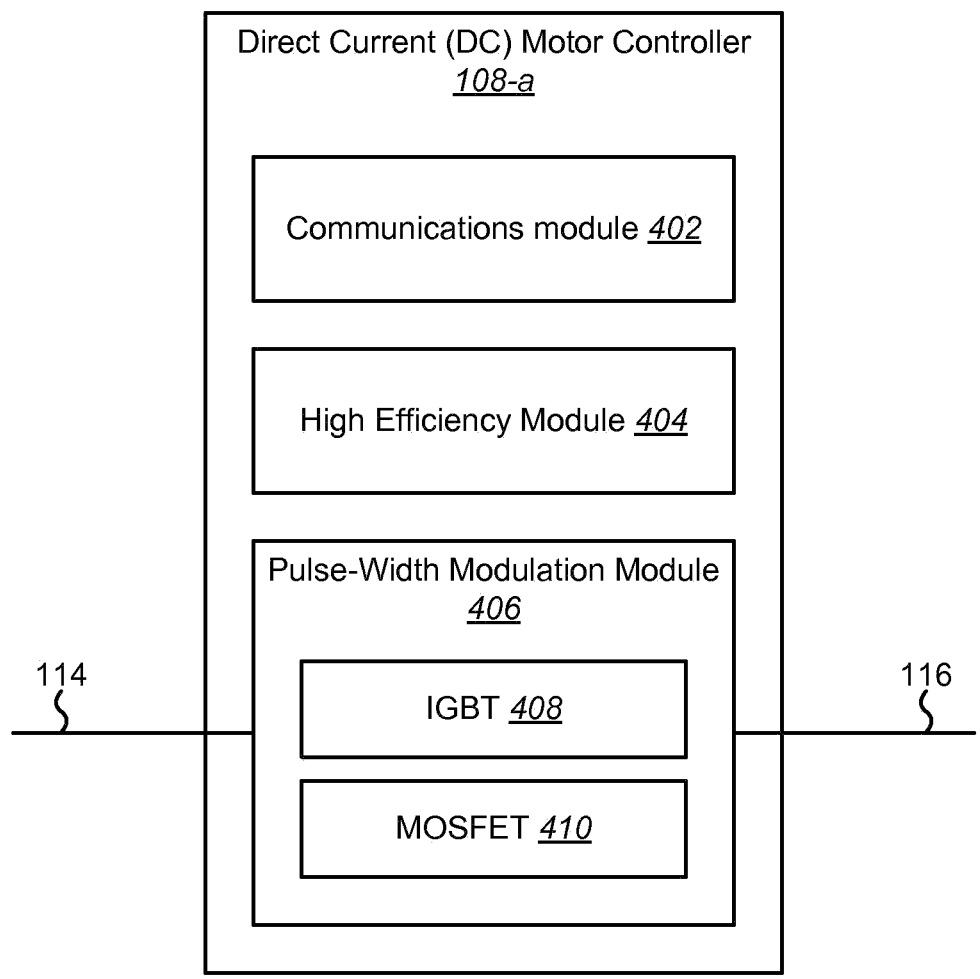
FIG. 4 is a block diagram illustrating one example of a DC motor controller.

FIG. 4 is a block diagram illustrating one example of a DC motor controller 108-a. The DC motor controller 108-a may be one example of the DC motor controller 108 illustrated in FIG. 1. In some configurations, the DC motor controller 108-a may include a communications module 402, a high efficiency module 404, and a pulse-width module 406.

In one embodiment, the communications module 402 may receive control commands. For example, the communications module 402 may receive a control command from the console of a treadmill. In one example, the control command may be a command to spin the motor (or a corresponding treadmill track, for example) at a particular speed (e.g., 16 mph).

In one embodiment, the high efficiency module 404 may obtain the control command from the communications module 402 and may direct the pulse-width modulation module 406 to provide the pulse-width modulation necessary to satisfy the control command. For example, the high efficiency module 404 may control the duty cycle that is supplied by the pulse-width modulation module 406.

In one embodiment, the pulse-width modulation module 406 may receive a high voltage DC signal from the power supply 104 via connection 114. In some configurations, the high voltage DC signal (from the power supply 104) may include a positive DC signal and a negative DC signal (e.g., +220 volts DC and −220 volts DC). In some configurations, the pulse-width modulation module 406 may switch on and off the high voltage DC signal to generate the pulse-width modulated signal for driving the DC motor 110. In some configurations, the pulse-width modulation module 406 may include an isolated gate bi-polar transistor (IGBT) and/or a MOSFET for switching the high voltage DC signal. In one embodiment, the DC motor controller 108-a may output the pulse-width modulated DC signal to the DC motor 110 via connection 116.

Figure 5:
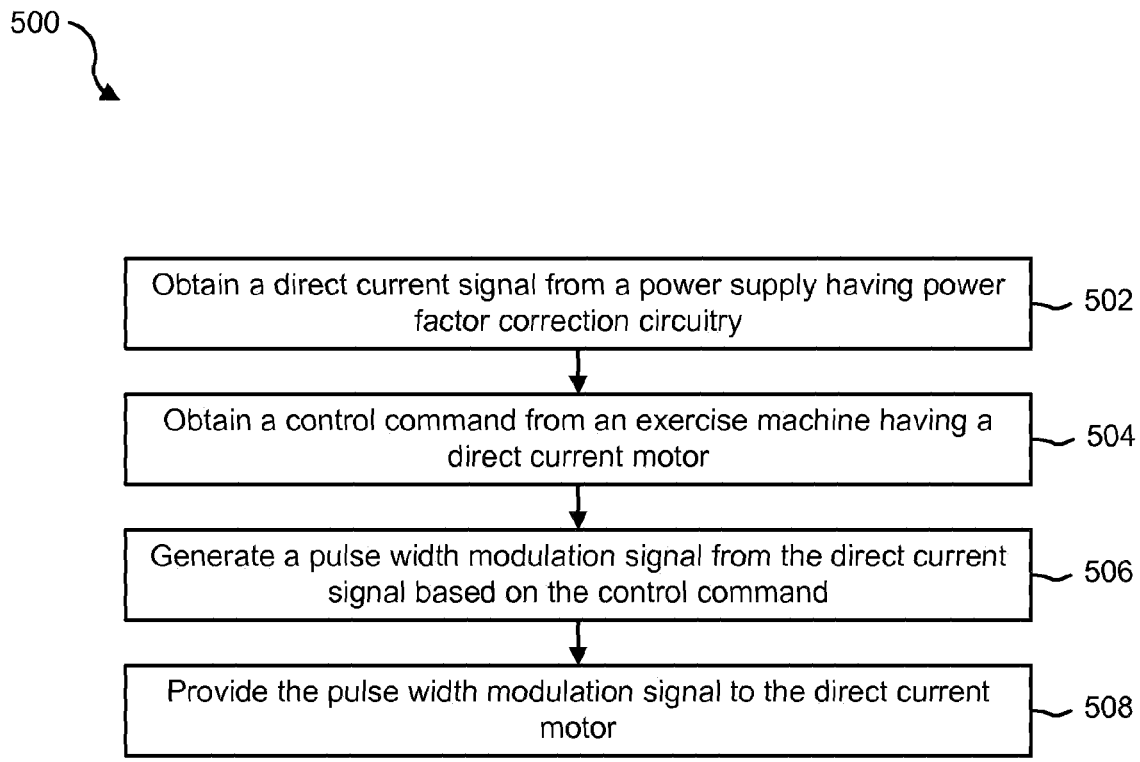
FIG. 5 is a flow diagram illustrating one embodiment of a method for providing high efficiency direct current motor control.

FIG. 5 is a flow diagram illustrating one embodiment of a method 500 for providing high efficiency direct current motor control. At step 502, a direct current signal may be obtained from a power supply having power factor correction circuitry. For example, the direct current signal may be a high voltage direct current signal. In one embodiment, the high voltage direct current signal may include a positive high voltage signal (e.g., +220 volts) and a negative high voltage signal (e.g., −220 volts). In some configurations, the power supply may be similar the power supply 104 illustrated in FIG. 1 or 2. At step 504, a control command may be obtained from an exercise machine having a direct current motor. For example, the control command may be received by the direct current motor controller 108 illustrated in FIG. 1 or 4. In one embodiment, the control command may be received from a treadmill control console (e.g., where a user adjusts the speed of the treadmill). At step 506, a pulse-width modulation signal may be generated from the direct current signal based on the control command. For example, the pulse-width modulation signal may be generated by the direct current motor controller 108 illustrated in FIG. 1 or 4. At step 508, the pulse-width modulation signal may be provided to the direct current motor. For example, the pulse-width modulation signal may be used to drive the direct current motor at the speed indicated by the control command.

Figure 6:
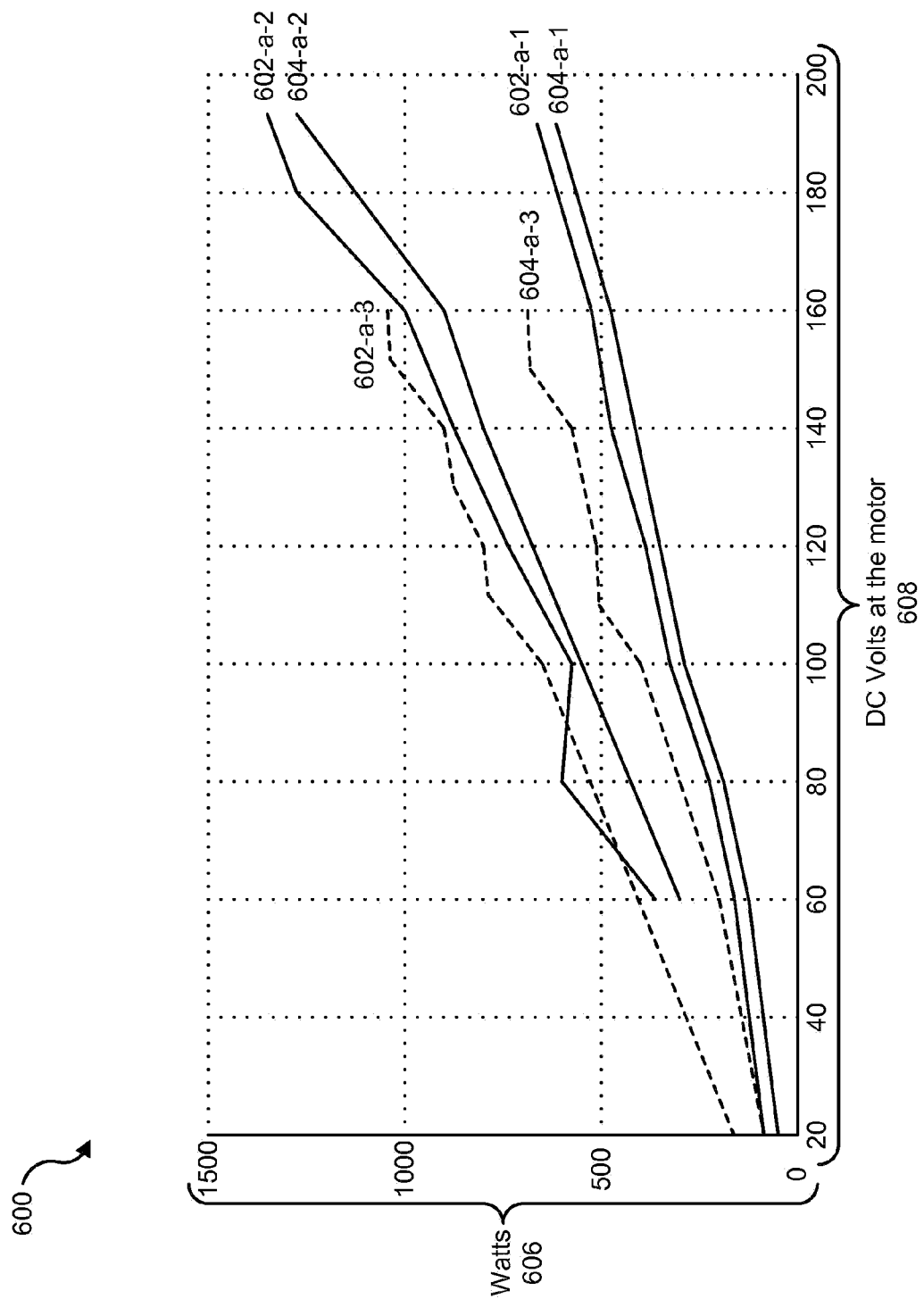
FIG. 6 is a comparison graph that illustrates the difference in power efficiency between the conventional direct current motor control and the high efficiency direct current motor control.

FIG. 6 is a comparison graph 600 that illustrates the difference in power efficiency between a conventional direct current motor control and the high efficiency direct current motor control of the present systems and methods. It is noted that FIG. 6 illustrates a representation of actual test results.

As illustrated, graph 600 illustrates watts 606 (e.g., power being consumed) with respect to DC volts at the motor 608 (e.g., the DC pulse-width modulated signal that is received via connection 116). Plots 602 and 604 may illustrate the power consumption (in watts) at a particular DC voltage (at the motor). Plots 602 illustrate the AC input power (e.g., the AC input power being received via connection 112). For example, plot 602-a-1 illustrates the AC input power for the high efficiency direct current motor control with no load, plot 602-a-2 illustrates the AC input power for the high efficiency direct current motor control with a 180 pound user, and plot 602-a-3 illustrates the AC input power for the conventional direct current motor control with a 180 pound user. Similarly, plots 604 illustrate the motor power that is being delivered to the motor (e.g., the pulse-width modulated DC power being received at the DC motor via connection 116). For example, plot 604-a-1 illustrates the motor power for the high efficiency direct current motor control with no load, plot 604-a-2 illustrates the motor power for the high efficiency direct current motor control with a 180 pound user, and plot 604-a-3 illustrates the motor power for the conventional direct current motor control with a 180 pound user.

The difference between the AC input power 602 and the motor power 604 may be used to illustrate the efficiency difference between the conventional direct current motor control and the high efficiency direct current motor control. For example, at 160 DC volts at the motor 608, the difference (for the conventional direct current motor control with a 180 pound load) between the AC input power 602-a-3 and the motor power 604-a-3 is around 400 watts. In some cases, this is lost power as a result of poor efficiency in the direct current motor control. It is noted that conventional direct current motor control is generally between 60-70% efficient. In contrast, at 160 DC volts at the motor 608, the difference (for the high efficiency direct current motor control with a 180 pound user) may be less than 100 watts. It is noted that that the high efficiency direct current motor control is better than approximately 90% efficient.

Figure 7:
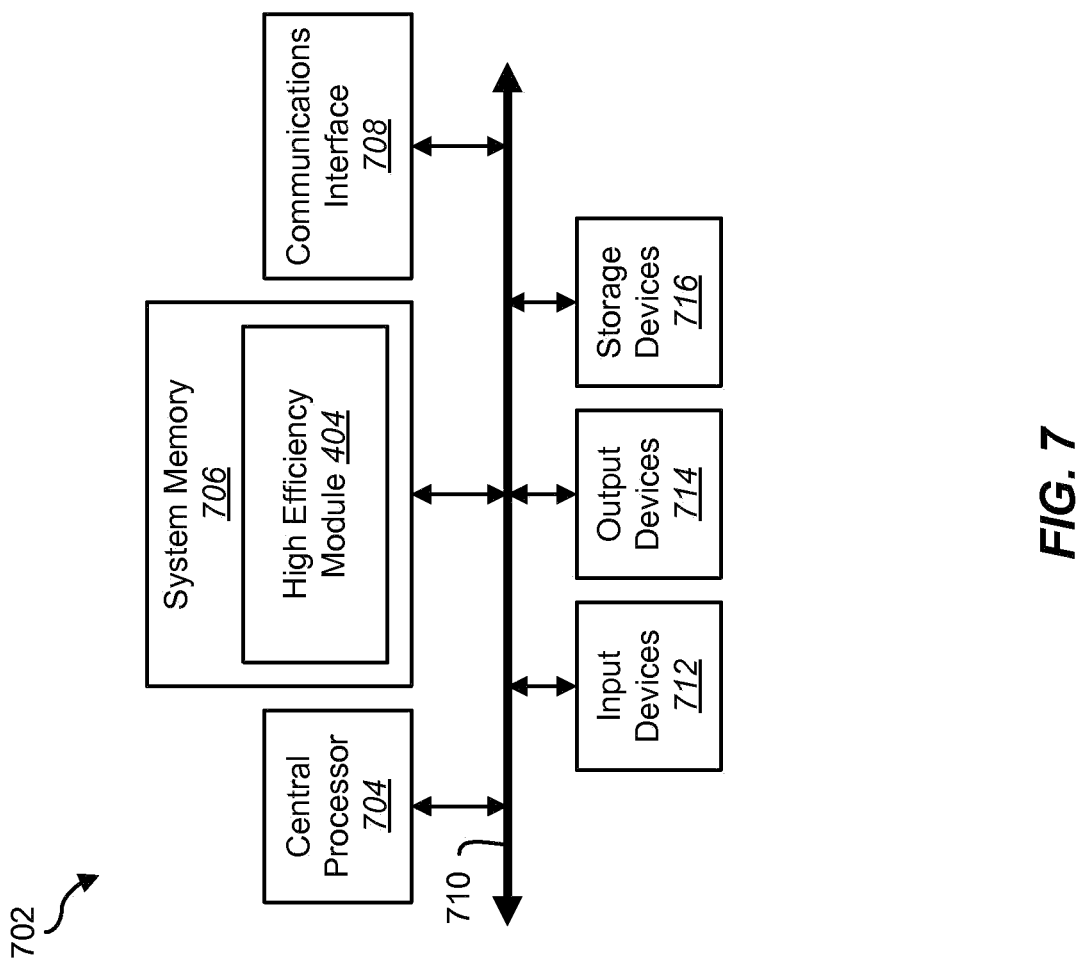
FIG. 7 depicts a block diagram of an exercise machine suitable for implementing the present systems and methods.

FIG. 7 depicts a block diagram of an exercise machine 702 suitable for implementing the present systems and methods. The electronic device 702 includes a bus 710 which interconnects major subsystems of computer system 702, such as a central processor 704, a system memory 706 (typically RAM, but which may also include ROM, flash RAM, or the like), a communications interface 708, input devices 712, output device 714, and storage devices 716 (hard disk, floppy disk, optical disk, etc.).

Bus 710 allows data communication between central processor 704 and system memory 706, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the high efficiency module 404 to implement the present systems and methods may be stored within the system memory 706. The high efficiency module 404 may be an example of the high efficiency module 404 illustrated in FIG. 4. Applications and/or algorithms resident with the electronic device 702 are generally stored on and accessed via a non-transitory computer readable medium (stored in the system memory 706, for example), such as a hard disk drive, an optical drive, a floppy disk unit, or other storage medium. Additionally, applications can be in the form of electronic signals modulated in accordance with the application and data communication technology when accessed via the communications interface 708

Communications interface 708 may provide a direct connection to a remote server or to the Internet via an internet service provider (ISP). Communications interface 708 may provide a direct connection to a remote server via a direct network link to the Internet via a POP (point of presence). Communications interface 708 may provide such connection using wireless techniques, including digital cellular telephone connection, Cellular Digital Packet Data (CDPD) connection, digital satellite data connection, or the like.

Many other devices or subsystems (not shown) may be connected in a similar manner. Conversely, all of the devices shown in FIG. 7 need not be present to practice the present systems and methods. The devices and subsystems can be interconnected in different ways from that shown in FIG. 7. The operation of an electronic device such as that shown in FIG. 7 is readily known in the art and is not discussed in detail in this application. Code to implement the present disclosure can be stored in a non-transitory computer-readable medium such as one or more system memory 706 and the storage devices 716.

INDUSTRIAL APPLICABILITY

In general, the present systems and methods provide a high efficiency direct current motor control for an exercise machine. In one example, the high efficiency direct current motor control may enable a user to exercise harder (e.g., run faster) within the limited power that available from a conventional residential circuit. For example, the high efficiency direct current motor control may be implemented in a treadmill. It is noted that the high efficiency direct current motor control may additionally or alternatively be implemented in an elliptical, bike, or other exercise machine.

Known DC motor based treadmills are typically limited to a 12 mph treadmill speed. Thus, users desiring to run faster than 12 mph may be unable to because the treadmill is unable to go faster than 12 mph. In general, this speed limitation is the result of not being able to get more power to the DC motor. Known DC motor based treadmills convert input AC into 160 volt high voltage DC that is switched into a pulse-width modulation DC voltage for driving the DC motor. However, in known treadmills, the 160 volt high voltage DC may be insufficient for going faster than 12 mph. It is noted that, known DC motor based treadmills are typically 60%-70% efficient.

In order to enable users to run faster than 12 mph and to operate the treadmill more efficiently, the present systems and methods provide a high efficiency direct current motor control for a treadmill. In some embodiments, the high efficiency direct current motor control may enable a user to run faster than 20 mph while using the power available in a traditional residential circuit.

A high efficiency treadmill motor control may convert 108-132 volts AC to 220 volts DC with approximately 95% to 97% efficiency (using power factor correction, for example). In some cases, the switching to generate the pulse-width modulated DC signal may cause additional losses, but the high efficiency treadmill motor control may provide pulse-width modulated DC power to the treadmill motor with more than approximately 90% efficiency. Thus, the high efficiency treadmill motor control may be able to provide more power to the motor.

The high efficiency treadmill motor control may allow a user to run faster (e.g., up to 20 mph or more). The high efficiency treadmill motor control may additionally allow the treadmill to operate more efficiently. Thus, in some cases, a user may run faster while using less power. The ability to run faster than 12 mph may encourage users to run faster. Additionally, the ability to use less energy while running may encourage users to run longer.

What is claimed is:

1. A method to provide high efficiency direct current motor control, comprising:
    obtaining, by a direct current motor controller, a high voltage direct current signal from a power supply having power factor correction circuitry;
    obtaining, by a processor, a control command from an exercise machine having a direct current motor;
    generating, by the processor, a pulse-width modulation signal from the direct current signal based on the control command; and
    providing, by the direct current motor controller, the pulse-width modulation signal to the direct current motor.

2. The method of claim 1, wherein the exercise machine comprises a treadmill.

3. The method of claim 1, wherein the power factor correction circuitry comprises a boost converter.

4. The method of claim 1, wherein the high voltage direct current has a magnitude of at least 180 volts.

5. The method of claim 1, wherein the power supply converts the alternating current to the high voltage direct current with at least 87% efficiency.

6. The method of claim 1, wherein the direct current motor drives a treadmill belt.

7. The method of claim 6, wherein the direct current motor drives the treadmill belt at a speed that is at least 13 miles per hour.

8. The method of claim 2, wherein the power supply draws less than 1800 watts from a circuit that provides less than 132 volts alternating current.

9. A computer program product comprising a non-transitory computer-readable medium storing executable instructions that, when executed by a processor, cause the processor to:
    obtain a high voltage direct current signal from a power supply having power factor correction circuitry;
    obtain a control command from an exercise machine having a direct current motor;
    generate a pulse-width modulation signal from the direct current signal based on the control command; and
    provide the pulse-width modulation signal to the direct current motor.

10. The computer program product of claim 9, wherein the exercise machine comprises a treadmill.

11. The computer program product of claim 9, wherein the power factor correction circuitry comprises a boost converter.

12. A method to provide high efficiency direct current motor control, comprising:
    receiving a control command to increase a speed of a tread belt;
    receiving a direct current signal from a power supply having power factor correction circuitry; and
    increasing the speed of tread belt in response to the control command and the direct current signal by generating a pulse-width modulated signal from the direct current signal and directing the pulse-width modulated signal to a motor that drives the tread belt.

13. The method of claim 12, wherein increasing the speed causes the tread belt to move at a rate greater than 13 miles per hour.

14. The method of claim 13, wherein the power supply draws less than 1800 watts.

15. The method of claim 12, wherein increasing the speed causes the tread belt to move at a rate greater than 18 miles per hour.

16. The method of claim 12, wherein the power supply is a residential power circuit.

17. The method of claim 12, further including converting an alternating current from the power supply to the direct current signal.

18. The method of claim 17, wherein converting an alternating current from the power supply to the direct current signal includes converting 108-132 volts alternating current to 220 volts direct current with 95% to 97% efficiency.

19. The method of claim 17, wherein the power supply converts the alternating current to the high voltage direct current with at least 87% efficiency.

20. The exercise machine of claim 12, wherein the power factor correction circuitry comprises a boost converter.

* * * * *